(12) United States Patent
Hossbach

(10) Patent No.: US 10,677,099 B2
(45) Date of Patent: Jun. 9, 2020

(54) TURBOCHARGER HAVING A NOZZLE RING CENTERED BY A GUIDING PROJECTION

(71) Applicant: MAN DIESEL & TURBO SE, Augsburg (DE)

(72) Inventor: Björn Hossbach, Diedorf (DE)

(73) Assignee: MAN Energy Solutions SE, Augsburg (DE)

( * ) Notice: Subject to any disclaimer, the term of this patent is extended or adjusted under 35 U.S.C. 154(b) by 87 days.

(21) Appl. No.: 15/790,783

(22) Filed: Oct. 23, 2017

(65) Prior Publication Data

US 2018/0171825 A1 Jun. 21, 2018

(30) Foreign Application Priority Data

Dec. 21, 2016 (DE) .................... 10 2016 125 189

(51) Int. Cl.
| | |
|---|---|
| F01D 17/16 | (2006.01) |
| F01D 25/24 | (2006.01) |
| F01D 11/00 | (2006.01) |
| F02C 6/12 | (2006.01) |
| F02C 7/28 | (2006.01) |
| F02B 37/24 | (2006.01) |
| F01D 17/14 | (2006.01) |

(52) U.S. Cl.
CPC .......... *F01D 25/246* (2013.01); *F01D 11/005* (2013.01); *F01D 17/165* (2013.01); *F02C 6/12* (2013.01); *F02C 7/28* (2013.01); *F01D 17/143* (2013.01); *F01D 17/16* (2013.01); *F02B 37/24* (2013.01); *F05D 2220/40* (2013.01); *F05D 2230/53* (2013.01); *F05D 2230/64* (2013.01)

(58) Field of Classification Search
CPC ...... F01D 17/165; F01D 17/167; F01D 17/16; F01D 17/143
See application file for complete search history.

(56) References Cited

U.S. PATENT DOCUMENTS

| | | | | |
|---|---|---|---|---|
| 6,928,816 B2* | 8/2005 | Leavesley | ............... | F01D 17/14 415/158 |
| 7,559,199 B2* | 7/2009 | Sausse | .................. | F01D 17/165 415/159 |
| 8,568,092 B2* | 10/2013 | Matsuyama | .......... | F01D 11/005 415/173.3 |
| 8,915,704 B2* | 12/2014 | Severin | ................. | F01D 17/165 415/164 |

(Continued)

*Primary Examiner* — Ninh H. Nguyen
*Assistant Examiner* — Behnoush Haghighian
(74) *Attorney, Agent, or Firm* — Cozen O'Connor

(57) ABSTRACT

A turbocharger (1), having a turbine (2) for expanding a first medium, having a compressor (3) for compressing a second medium utilizing energy extracted in the turbine (2) during the expansion of the first medium, wherein the turbine (2) has a turbine housing (4) and a turbine rotor (5). The compressor (3) has a compressor housing (6) and a compressor rotor (7) that is coupled to the turbine rotor (5) via a shaft (8). The turbine housing (4) and the compressor housing (6) are each connected to a bearing housing (9) arranged there between, in which the shaft (8) is mounted. The turbine housing (4) has an inflow housing (11), a nozzle ring (15) with guide blades (16) and an insert piece (13). The nozzle ring (15) is centered and radially guided by a projection (17) on the bearing housing (9).

10 Claims, 3 Drawing Sheets

(56) References Cited

U.S. PATENT DOCUMENTS

| | | | | |
|---|---|---|---|---|
| 8,967,955 B2* | 3/2015 | Barthelet | ............ | F02C 6/12 |
| | | | | 415/158 |
| 8,967,956 B2* | 3/2015 | Arnold | ............ | F01D 17/16 |
| | | | | 415/158 |
| 8,985,943 B2* | 3/2015 | Groves | ............ | F01D 11/001 |
| | | | | 415/162 |
| 9,017,017 B2* | 4/2015 | Sausse | ............ | F01D 17/165 |
| | | | | 415/160 |
| 9,188,019 B2* | 11/2015 | Groves | ............ | F01D 17/165 |
| 9,618,005 B2* | 4/2017 | Segawa | ............ | F01D 11/005 |
| 9,650,913 B2* | 5/2017 | Annati | ............ | F01D 21/04 |
| 9,732,633 B2* | 8/2017 | Annati | ............ | F01D 25/26 |
| 9,810,238 B2* | 11/2017 | Annati | ............ | F04D 29/4226 |
| 9,822,784 B2* | 11/2017 | Aiba | ............ | F01D 17/165 |
| 9,879,594 B2* | 1/2018 | Annati | ............ | F02B 37/24 |
| 9,938,894 B2* | 4/2018 | Groves | ............ | F02B 37/24 |
| 10,030,576 B2* | 7/2018 | Ueda | ............ | F01D 17/165 |
| 10,087,774 B2* | 10/2018 | Barthelet | ............ | F01D 17/16 |
| 10,233,828 B2* | 3/2019 | Segawa | ............ | F01D 17/165 |
| 2009/0092483 A1* | 4/2009 | Yasui | ............ | F01D 17/165 |
| | | | | 415/159 |
| 2010/0310363 A1* | 12/2010 | Matsuyama | ............ | F01D 17/165 |
| | | | | 415/212.1 |
| 2013/0149129 A1* | 6/2013 | Matsuyama | ............ | F01D 25/24 |
| | | | | 415/208.1 |
| 2014/0099191 A1* | 4/2014 | Kotzbacher | ............ | F01D 17/165 |
| | | | | 415/159 |
| 2016/0265388 A1* | 9/2016 | Annati | ............ | F01D 25/26 |
| 2017/0335756 A1* | 11/2017 | Donkin | ............ | F02B 37/10 |
| 2018/0045106 A1* | 2/2018 | Musil | ............ | F01D 25/24 |
| 2018/0100429 A1* | 4/2018 | Masa | ............ | F02B 37/24 |

* cited by examiner

TURBOCHARGER HAVING A NOZZLE RING CENTERED BY A GUIDING PROJECTION

BACKGROUND OF THE INVENTION

1. Field of the Invention

The present invention relates to a turbocharger.

2. Description of the Related Art

FIG. 1 shows the fundamental construction of a prior art turbocharger 1. A turbocharger 1 comprises a turbine 2 for expanding a first medium, in particular for expanding exhaust gas of an internal combustion engine, wherein, during the expansion of the first medium, energy is extracted. The turbocharger 1 also comprises a compressor 3 for compressing a second medium, in particular charge air, to be fed to an internal combustion engine, utilizing the energy extracted during the expansion of the first medium in the turbine 2.

The turbine 1 comprises a turbine housing 4 and a turbine rotor 5. The compressor 3 comprises a compressor housing 6 and a compressor rotor 7. Turbine rotor 5 and compressor rotor 7 are coupled via a shaft 8 which is mounted in a bearing housing 9. The bearing housing 9 is positioned between the turbine housing 4 and the compressor housing 6.

FIG. 1, furthermore, shows an optional sound damper 10, which is connected to the compressor housing 6.

The turbine housing 4 comprises an inflow housing 11 and an outflow housing 12. By way of the inflow housing 11, the first medium to be expanded is fed to the turbine rotor 5, here in a radial direction. By way of the outflow housing 12, the expanded first medium can be discharged from the turbine rotor 5, here in an axial direction. The inflow housing 11 is connected on one side to the bearing housing 9 and on the other side to the outflow housing 12.

The turbine housing 4 comprises an insert piece 13 and a nozzle ring 15. The insert piece 13 follows moving blades 14 of the turbine rotor 5 radially outside and delimits a flow duct of the inflow housing 11 at least in sections. The nozzle ring 15 comprises guide blades 16 which are positioned upstream of the turbine rotor 5 and which serve for the flow control upstream of the turbine rotor 5.

Previously, the positioning of the insert piece 13 and of the nozzle ring 15 created difficulties, in particular with a view to deformations due to the operation in the region of the inflow housing 11 of the turbine housing 4. Accordingly, deformations due to the operation in exhaust gas turbochargers known from practice in the region of the inflow housing 11 of the turbine housing 4 affect the positioning of insert piece 13 and nozzle ring 15, as a result of which a gap between rotor side assemblies of the turbine 2 and stator side assemblies is subjected to the same changes, which can excite vibrations in the rotor 5 and, in an extreme case, can result in the moving blades 14 of the turbine rotor 5 running into stator side assemblies, in particular, into the insert piece 13, or rub against the insert piece 13.

SUMMARY OF THE INVENTION

The present invention creates a new type of turbocharger. According to the present invention, the nozzle ring is centered and radially guided on the bearing housing by a projection formed on the nozzle ring.

Because the nozzle ring is centered and radially guided on the bearing housing by a projection formed on the nozzle ring, the positioning of the nozzle ring is independent of the inflow housing of the turbine housing and thus also independent of deformations of the inflow housing in operation.

According to a further embodiment of the present invention, the nozzle ring and the insert piece are embodied integrally and form a monolithic assembly. This further embodiment of the present invention has the advantage that the insert piece which, together with the nozzle ring, forms a monolithic assembly is also centered and radially guided on the bearing housing by the projection of the nozzle ring. Accordingly, the positioning of the insert piece is also independent of the inflow housing of the turbine housing and thus of deformations of the inflow housing in operation.

According to a further embodiment of the present invention, spring elements are used to act on a section of the inflow housing and on a section of the insert piece to push the nozzle ring and the insert piece axially in the direction of the bearing housing. The spring elements position the insert piece and the nozzle ring axially. The spring elements, which act on the insert piece and inflow housing, push the insert piece and the nozzle ring, which preferentially form a monolithic assembly, against the bearing housing so that the insert piece and the nozzle ring are positioned in an axial direction. At the same time, the springs offset deformations in the region of the inflow housing in operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, it is merely intended to conceptually illustrate the structures described herein.

BRIEF DESCRIPTION OF THE DRAWINGS

In the drawings, where like reference numerals represent similar elements.

DETAILED DESCRIPTION OF THE PRESENTLY PREFERRED EMBODIMENTS

Figure 1:
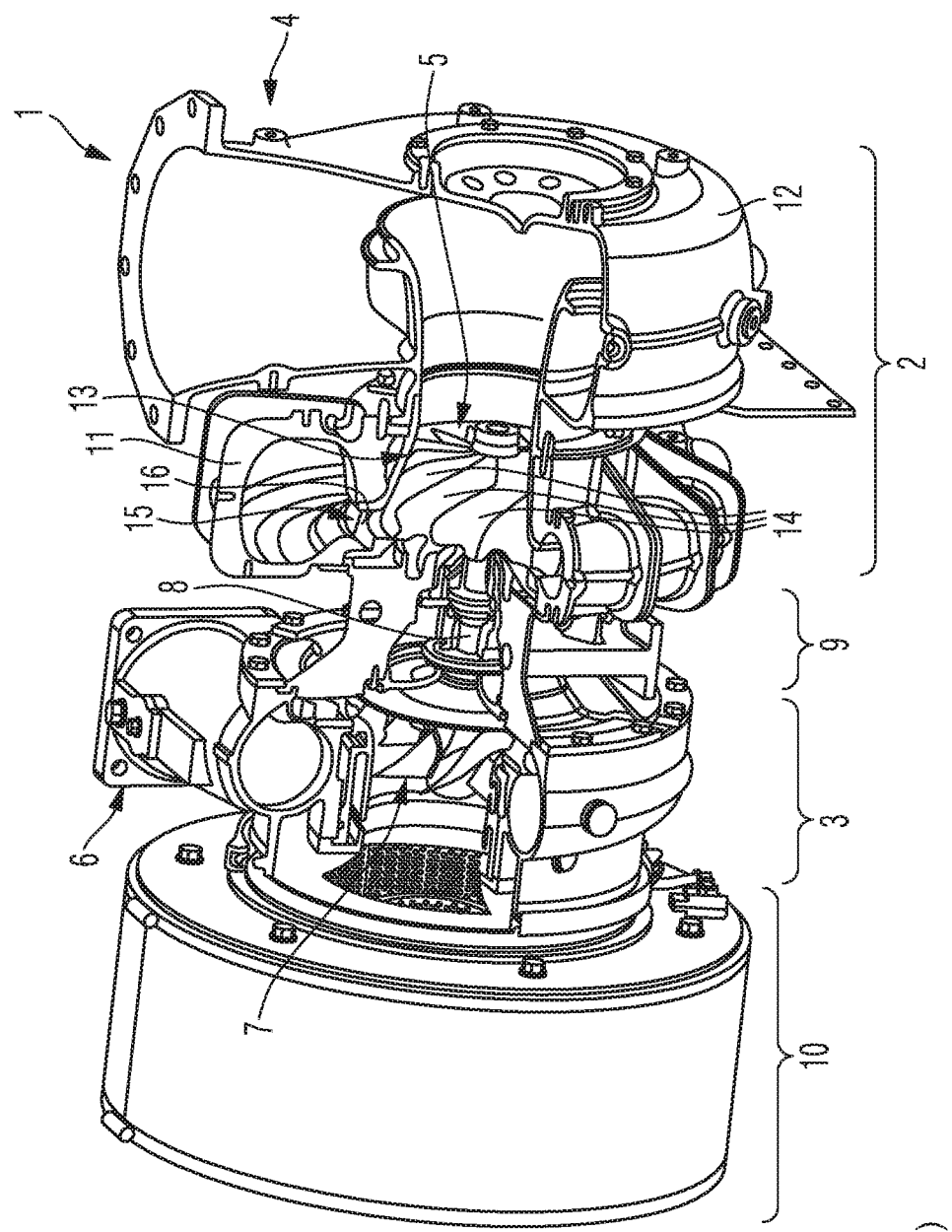
FIG. 1 is a cross sectional view through a prior art turbocharger.
Figure 2:
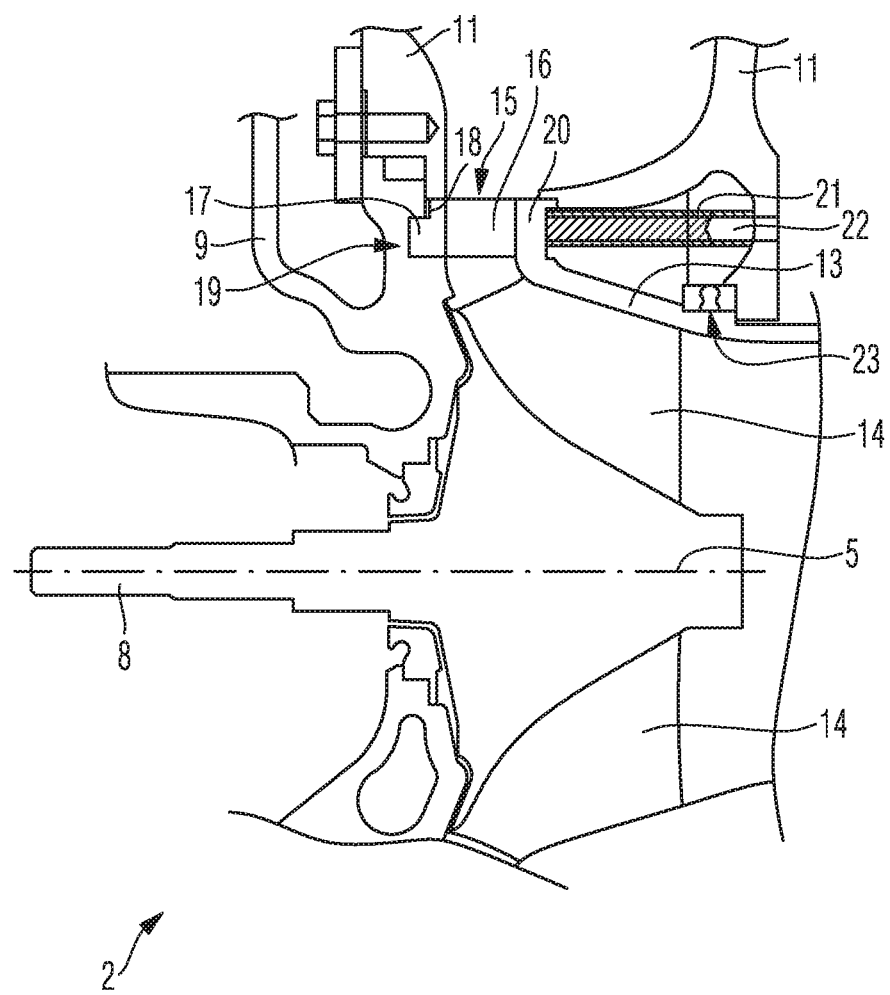
FIG. 2 is a cross sectional view through a turbocharger according to an embodiment of the present invention in the region of the turbine of the turbocharger.

Referring to FIG. 2, which shows the region of a turbine 2 of a turbocharger in accordance with an embodiment of the present invention, the nozzle ring 15 of the turbocharger 1 and turbine 2 shown in FIG. 1 is centered and radially guided on the bearing housing 9 by a projection 17, which is formed on a first cover ring 18 of the nozzle ring 15 facing the bearing housing 9. The projection 17 of the nozzle ring 15 engages a corresponding groove 19 in the bearing housing 9. Accordingly, the centering and radial guidance of the nozzle ring 15 is independent of the inflow housing 11 of the turbine housing 4 and thus independent of deformations of the inflow housing 11 in operation.

Figure 3:
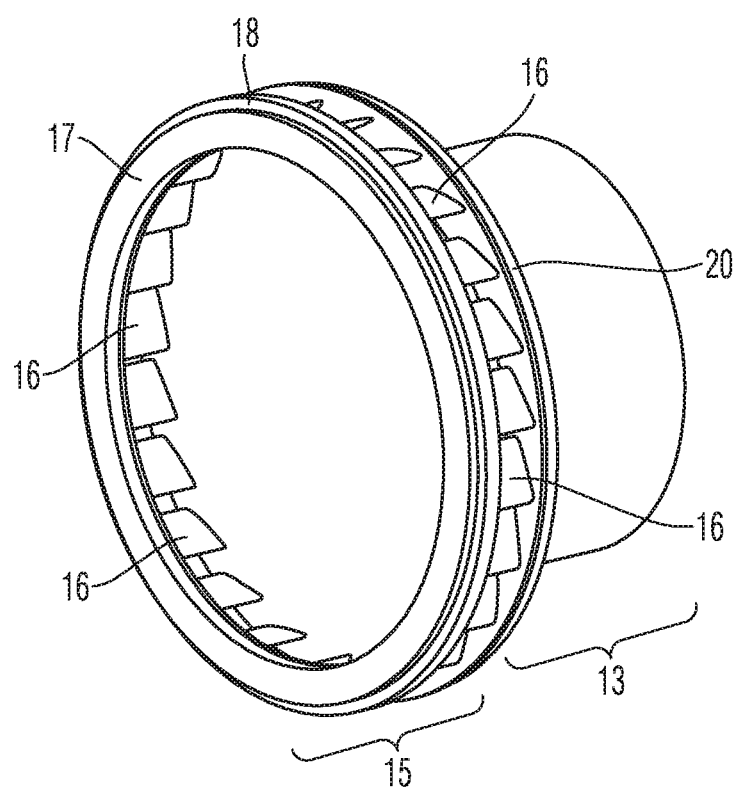
FIG. 3 is a detailed view of the turbocharger shown in FIG. 2 according to an embodiment of the present invention.

According to an advantageous further embodiment of the present invention shown in detail in FIG. 3, the nozzle ring 15 and the insert piece 13 are embodied integrally and form a monolithic assembly. In this case, the nozzle ring 15 then comprises a second cover ring 20 in addition to the first cover ring 18 facing the bearing housing 9, and the guide blades 16 of the nozzle ring 15 extend between the two cover rings 18, 20, which are spaced from one another in an axial direction.

Through the integral, monolithic embodiment of nozzle ring 15 and insert piece 13, not only is the nozzle ring centered and radially guided on the bearing housing 9, but also is the insert piece 13, together with the nozzle ring 15.

According to an advantageous further embodiment of the present invention as shown in FIG. 2, spring elements 21 act on a section of the inflow housing 11 of the turbine housing 4 and on a section of the insert piece 13 on the second cover ring 20 of the nozzle ring 15, which, together with the insert piece 13, form a monolithic assembly. The spring elements 21 push the insert piece 13, and thus the nozzle ring 15, in an axial direction against the bearing housing 9, i.e., axially pushing the projection 17 on the first cover ring 18 of the nozzle ring 15 into the groove 19 of the bearing housing 9. Spring elements 21 accordingly position the insert piece 13 and the nozzle ring 15 in an axial direction. The spring elements 21 are guided on pin-like projections 22 of the inflow housing 11.

A sealing element 23 is preferably positioned downstream of the turbine rotor 5 between the insert piece 13 and an adjoining section of the inflow housing 11 to seal the insert piece 13, in particular, the monolithic assembly consisting of insert piece 13 and nozzle ring 15, downstream of the moving blades 14 of the turbine rotor 5 against the inflow housing 11.

According to a particularly preferred embodiment of the present invention, the insert piece 13 and the nozzle ring 15 are embodied as a monolithic assembly that is centered and radially guided on the bearing housing 9 by a projection 17 of the nozzle ring 15. The spring elements 21 position this monolithic assembly in an axial direction, likewise pushing against the bearing housing 9 in an axial direction. Deformations of the inflow housing 11 of the turbine housing 4 due to the operation then have no influence on the position of nozzle ring 15 and insert piece 13 so that an exact gap can thus always be maintained in particular between the moving blades 14 and the turbine rotor 5 and the insert piece 13, as a result of which rubbing of the moving blades 14 of the turbine rotor 5 in the insert piece 13 is avoided.

Thus, while there have shown and described and pointed out fundamental novel features of the invention as applied to preferred embodiments thereof, it will be understood that various omissions and substitutions and changes in the form and details of the device illustrated, and in its operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger comprising:
   a turbine configured for expanding a first medium, the turbine comprising:
      a turbine housing; and
      a turbine rotor rotatably mounted within the turbine housing,
      wherein the turbine housing comprises:
         an inflow housing;
         a nozzle ring mounted within the inflow housing and having guide blades for controlling flow of the first medium from the turbine rotor;
         an axially extending stepped projection arranged on the nozzle ring; and
         an insert piece that delimits a flow duct of the inflow housing;
   a shaft;
   a compressor configured for compressing a second medium utilizing energy extracted in the turbine during the expansion of the first medium, the compressor comprising:
      a compressor housing; and
      a compressor rotor rotatably mounted within the compressor housing, the compressor rotor being coupled to the turbine rotor by the shaft; and
   a bearing housing positioned between, and connected to, the turbine housing and the compressor housing, the shaft being mounted within the bearing housing, the bearing housing having an axially groove having a radially extending step,
   wherein the nozzle ring is centered about the shaft and radially guided onto the bearing housing by the stepped projection that mates with the stepped axial groove of the bearing housing.

2. The turbocharger of claim 1, wherein the axially extending projection of the nozzle ring engages the axially extending groove.

3. The turbocharger of claim 1, wherein the nozzle ring further comprises a first cover ring and a second cover ring, wherein the guide blades of the nozzle ring are positioned between the first cover ring and the second cover ring.

4. The turbocharger of claim 3, wherein the projection is formed on the first cover ring.

5. The turbocharger of claim 1, wherein the nozzle ring and the insert piece are embodied integrally.

6. The turbocharger of claim 1, wherein the nozzle ring and the insert piece are embodied as monolithic assembly.

7. The turbocharger of claim 1, further comprising spring elements positioned to act on a section of the inflow housing and on a section of the insert piece so as to push the insert piece and the nozzle ring toward the bearing housing.

8. The turbocharger of claim 7, wherein the spring elements position the insert piece and the nozzle ring axially relative to the shaft.

9. The turbocharger of claim 1, further comprising a sealing element positioned between the inflow housing and the insert piece.

10. The turbocharger of claim 1, wherein the axial groove is defined by two axially extending walls at its radial edges and two radially extending walls that are joined by an axially extending wall therebetween.

* * * * *